Figure 1:
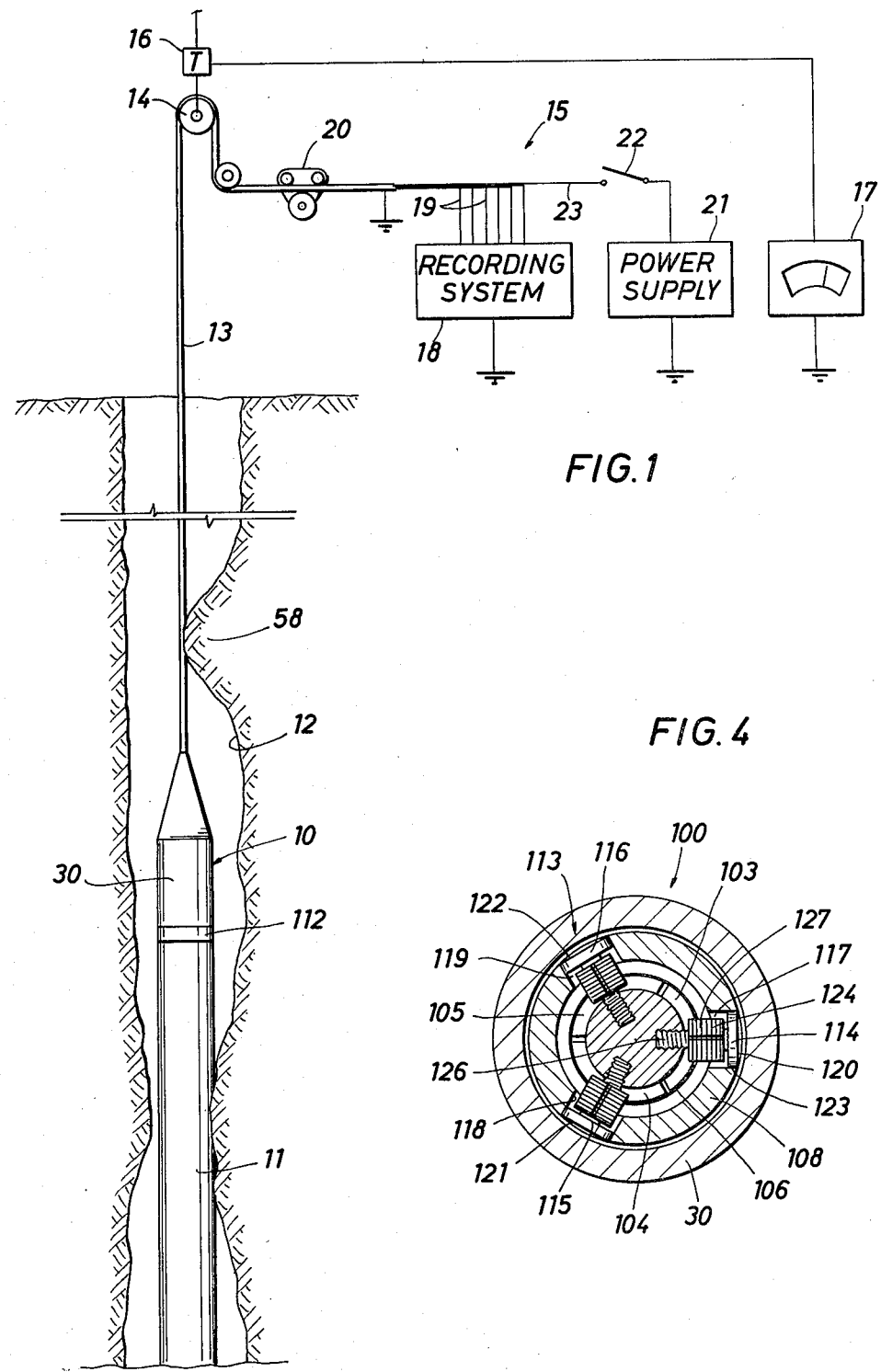

United States Patent [19]
Lee

[11] 4,275,786
[45] Jun. 30, 1981

[54] APPARATUS FOR SELECTIVELY COUPLING CABLES TO WELL TOOLS

[75] Inventor: Arley G. Lee, Pasadena, Tex.

[73] Assignee: Schlumberger Technology Corporation

[21] Appl. No.: 969,916

[22] Filed: Dec. 15, 1978

[51] Int. Cl.³ .............................................. E21B 47/00
[52] U.S. Cl. .................................... 166/65 R; 166/63; 285/33; 285/306; 285/DIG. 21; 285/DIG. 23; 294/86.17; 403/2; 403/15; 403/31; 403/32
[58] Field of Search ........................ 294/86.17, 86.18; 403/2, 31, 32, 15; 166/65 R, 63; 285/306, 18, 33–35, DIG. 21, DIG. 23

[56] References Cited
U.S. PATENT DOCUMENTS

| | | | |
|---|---|---|---|
| 2,621,895 | 12/1952 | Toelke | 285/DIG. 23 |
| 3,253,653 | 5/1966 | Layre | 285/33 X |
| 3,327,784 | 6/1967 | Pardue | 166/65 R |
| 3,373,817 | 3/1968 | Cubberly, Jr. et al. | 166/65 R |
| 3,517,740 | 6/1970 | Johnson | 166/63 |
| 3,782,838 | 1/1974 | Tirapolsky | 403/32 |

Primary Examiner—William F. Pate, III

[57] ABSTRACT

In the several representative embodiments of selectively-operable well bore apparatus disclosed herein for dependently coupling a well tool to a suspension cable, a collapsible assembly of two or more retaining members is arranged within an enclosed chamber and operatively positioned for normally retaining upper and lower tool-support members in a position where they are tandemly coupled or interconnected. In each of the several embodiments of the invention disclosed herein, electrically-responsive securing means normally maintaining the collapsible assembly in its initial position are cooperatively arranged to be selectively failed so as to allow collapse of the retaining assembly should it become necessary to separate the cable from the well tool while it is in a well bore. Provisions are also made for admitting well bore fluids into the enclosed chamber upon collapse of the retaining assembly so as to assure release of the cable even under extreme well bore pressures.

38 Claims, 6 Drawing Figures

U.S. Patent Jun. 30, 1981 Sheet 3 of 3 4,275,786

APPARATUS FOR SELECTIVELY COUPLING CABLES TO WELL TOOLS

It is not at all uncommon for a cable-suspended well tool such as a logging instrument to become stuck in a well bore as it is being used. When it has been determined that the tool cannot otherwise be dislodged, the usual practice is to selectively release the lower end of the cable from the tool so that so-called "fishing" equipment can then be utilized for pulling the stuck tool free. Ordinarily selective release of the cable is provided for by tandemly interconnecting the free end of the cable to the head of the well tool by way of a so-called "weak-point member" having a reduced portion of less tensile strength than the cable. Thus, should the tool become stuck, the cable can usually be disconnected by operating the cable winch so as to pull on the surface end of the cable with sufficient force to break the interlinking weak-point connection in the tool head.

It will be appreciated, of course, that a weak-point connection must have sufficient tensile strength to support the static weight of the tool as well as to withstand whatever additional loads that may be experienced either in raising the tool or in reasonable efforts to dislodge the tool should it become stuck. As a result of such load-carrying requirements, a given weak-point member may be so strong that, in some circumstances, the suspension cable instead parts near the surface as it is being tensioned to break the weak-point member. By way of example, assume that a tool which is stuck in a well bore is suspended from a cable having an average tensile strength of 12,000-pounds and that the particular weak-point member in that tool head is designed to fail at 6,000-pounds. If the combined weight of the cable already in the well bore and the tool is 6,000-pounds, it is quite likely that the suspension cable will instead part near the top of the well before sufficient tension can be applied to break the weak-point member. Similarly, an undetected weakened portion of a given cable can also break before the weak-point member breaks. These problems, of course, become more pronounced as the operating depth increases and a greater weight of cable is in the well bore. It will, of course, be recognized that breaking of the cable at some intermediate point must be avoided if at all possible so that a loose skein of cable will not be left on top of the tool to unduly hamper subsequent fishing operations.

There are other instances where a conventional weak-point connection is not even usable such as, for example, when the cable itself has become stuck (as by keyseating or differential sticking in an uncased borehole) at one or more intermediate depth locations. Should this happen, sufficient cable tension usually cannot be applied from the surface so as to always break the weak-point member in the tool head without instead parting the cable at some point above the highest depth location where it is stuck.

Because of such problems, various proposals have been made heretofore to provide devices that require little or no cable tension to selectively uncouple a suspension cable from a well tool. As disclosed in U.S. Pat. No. 3,327,784 and U.S. Pat. No. 3,373,817 for example, cable-coupling devices of this nature have heretofore employed solenoid-actuated mechanisms for selectively disabling or bypassing the standard weak-point connection on the tool so that a somewhat-lower tension force will then be sufficient for freeing the cable from the tool head. Neither of these two cable-coupling devices have been entirely satisfactory, however, since the minimum-allowable release force for each device is ordinarily about twice the static weight of the tool. Experience has shown that in many operational situations even such minimum release forces can well be unacceptably excessive.

As shown in U.S. Pat. No. 3,517,740, another type of cable-coupling device used heretofore utilizes an electrically-actuated explosive charge for selectively severing the weak-point member should it not be possible to safely pull on the cable. Although explosive devices such as this require little or no cable pull, their reliability is wholly dependent upon the effectiveness of the explosive. As will be appreciated by those skilled in the art, any explosive is seriously affected, if not rendered totally inoperative, should it be exposed to extreme well bore temperatures for only a few hours. Under such conditions it may be necessary to operate the coupling device before attempting other procedures for freeing a stuck tool. In addition to the usual problems experienced in handling, shipping and storing explosives, prudent preventative maintenance procedures may also require replacement of the unexpended explosive charges each time these explosive cable-coupling units have been subjected to extreme well bore temperatures for any significant length of time.

Accordingly, it is an object of the present invention to provide apparatus for coupling a well tool to a suspension cable, with this apparatus being operative for selectively releasing the cable from the tool with little or no cable tension being required.

This and other objects of the present invention are attained by releasably coupling a cable-suspended well tool to a typical suspension cable by means of tandemly-associated upper and lower support members of sufficient strength to carry at least the weight of the tool. Retaining means are appropriately arranged in an enclosed chamber on the tool for normally retaining the upper and lower members in a tool-supporting relationship and for selectively disassociating the support members in response to an electrical signal should it be wished to release the cable while the tool is in a well bore. To assure release of the cable even under extreme well bore pressures, the new and improved apparatus of the present invention further includes means for contemporaneously admitting well bore fluids into the enclosed chamber.

Figure 2:
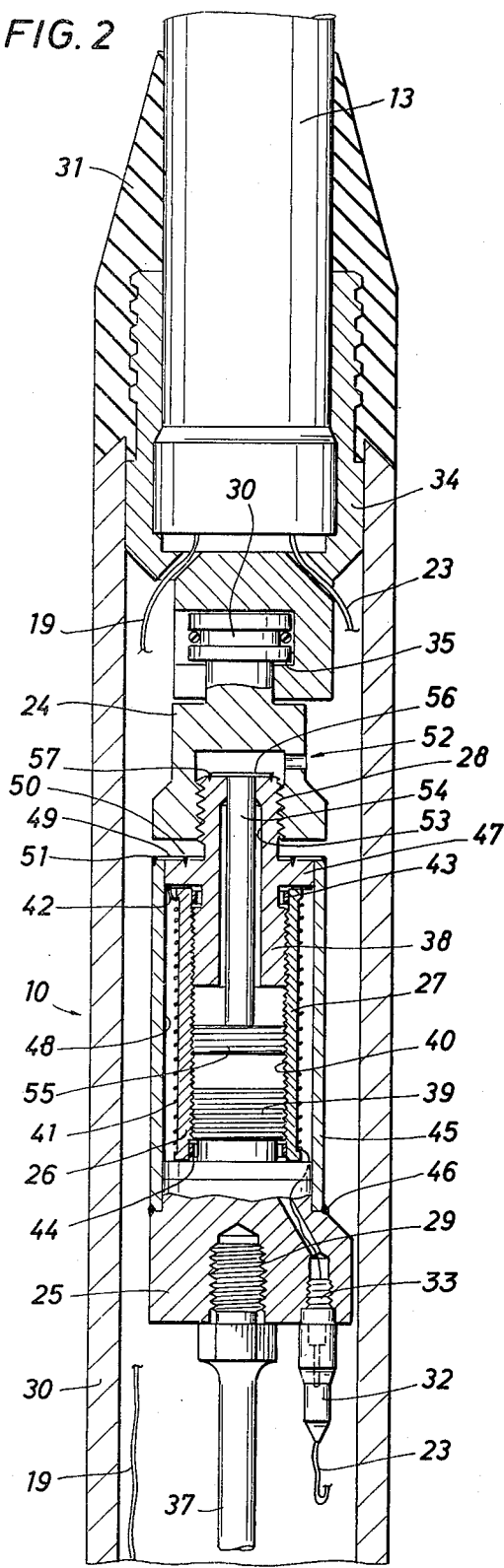
Figure 3:
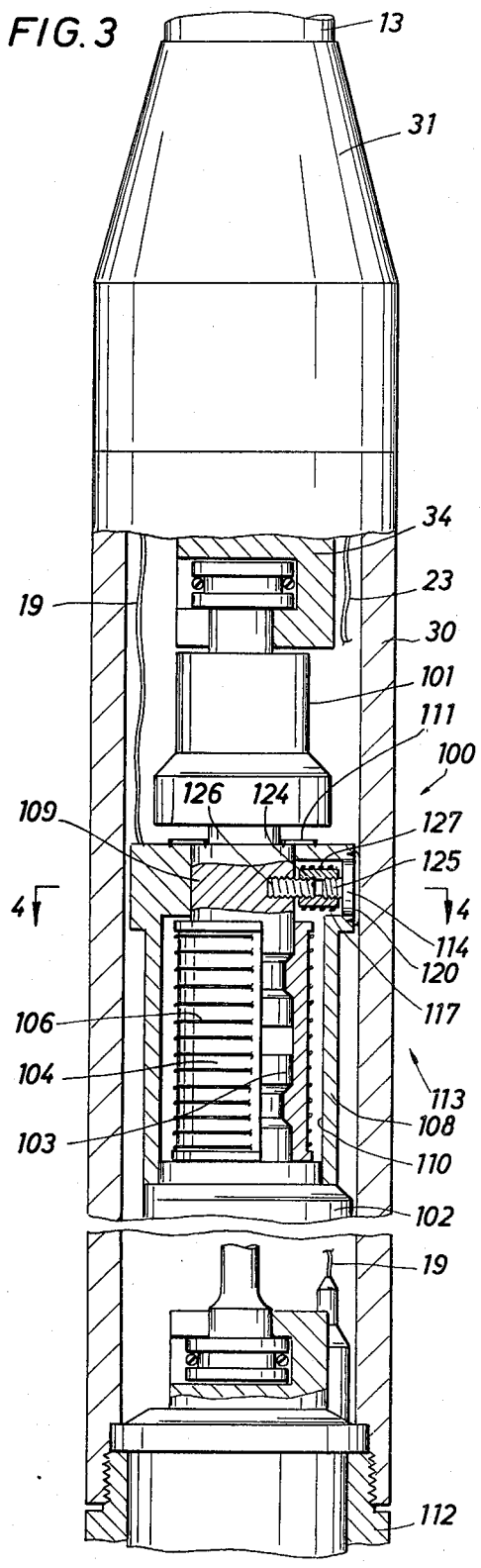
Figure 5:
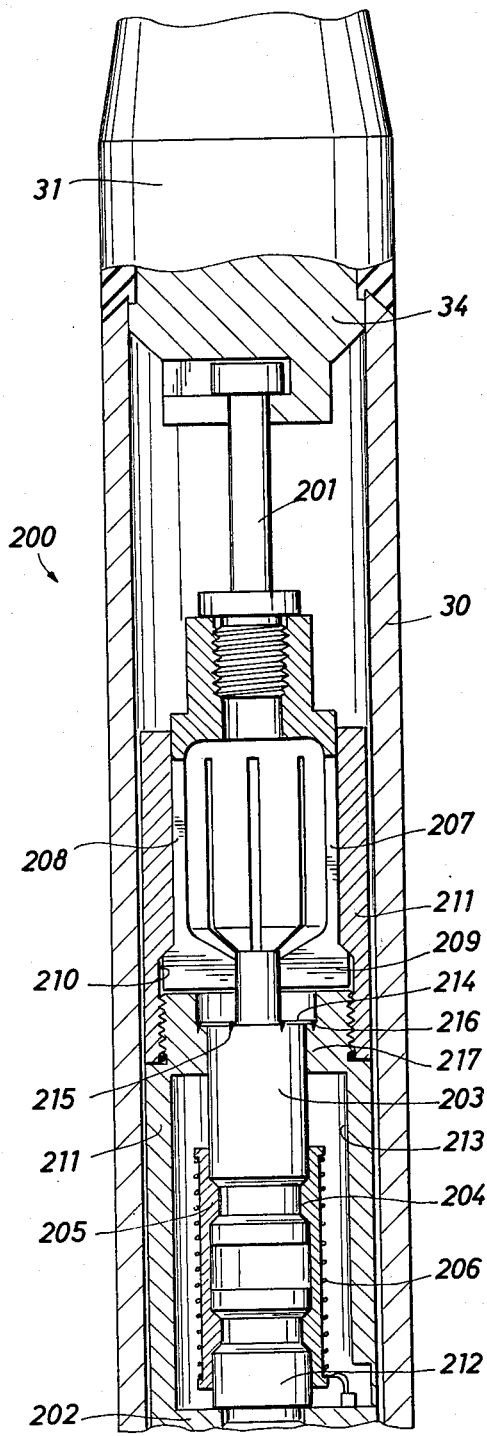
Figure 6:
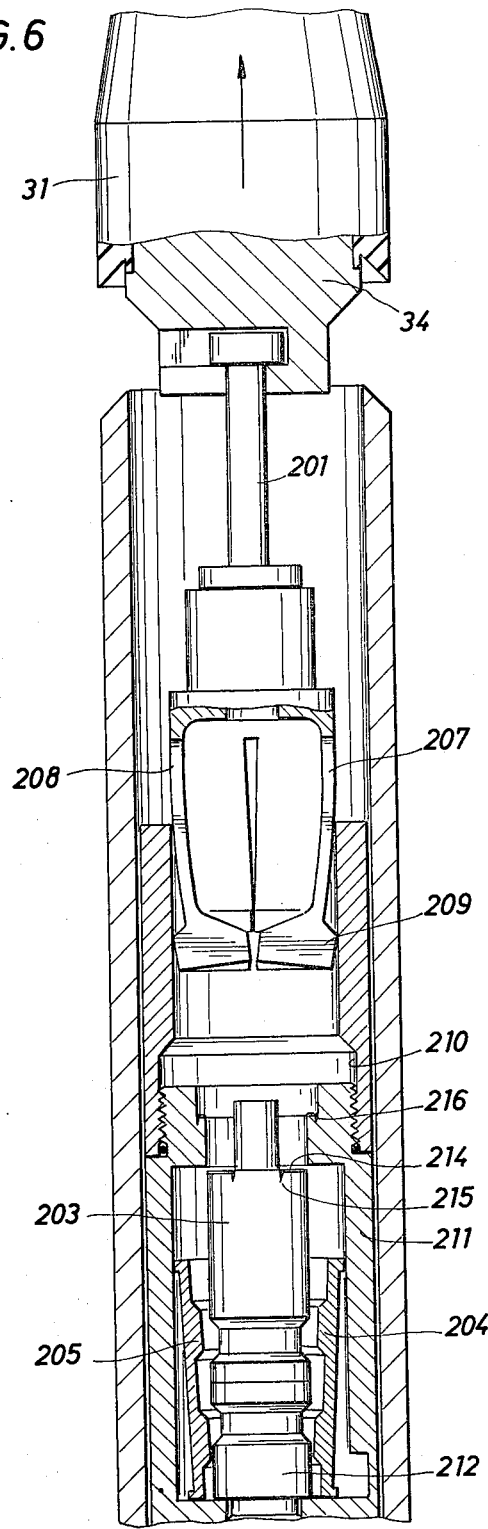

The novel features of the present invention are set forth with particularity in the appended claims. The invention, together with further objects and advantages thereof, may be best understood by way of the following description of several exemplary embodiments of new and improved apparatus respectively employing the principles of the invention as illustrated in the accompanying drawings, in which:

FIG. 1 is a schematic representation of a well tool provided with any one of several new and improved cable-coupling apparatus disclosed herein as the tool may appear when it has become stuck in an uncased well bore;

FIGS. 2, 3 and 5 respectively illustrate three alternative embodiments of selectively-operable cable-coupling apparatus respectively incorporating the principles of the present invention;

FIG. 4 is a transverse cross-sectional view taken along the line '4—4' in FIG. 3 to further illustrate the embodiment of the invention shown in FIG. 3; and FIG. 6 is a view similar to FIG. 5 but shows that embodiment of the present invention once it has been selectively operated to uncouple a suspension cable from a stuck well tool.

Turning now to FIG. 1, to illustrate a typical application of the cable-coupling apparatus 10 of the present invention, the new and improved apparatus is schematically shown as it may be arranged in the uppermost body or head of a typical well tool 11 which is dependently supported within a borehole 12 by an armored suspension cable 13. As is customary, the suspension cable 13 is spooled on a winch (not shown) conveniently situated adjacent to the borehole 12 and passed over a sheave 14 suspended above the mouth of the borehole. Typical surface instrumentation 15 includes a load-responsive transducer 16 supporting the sheave 14 that is cooperatively arranged and coupled to a suitable display device 17 for indicating the tension on the cable 13 at any time and a galvanometer or CRT data-recording unit 18 that is connected to electrical conductors, such as at 19, in the cable. The surface instrumentation 15 further includes a measuring wheel 20 cooperatively arranged to be frictionally engaged with the cable 13 and rotatably driven by upward and downward movements of the cable so that the data measurements supplied to the recording unit 18 will be presented in relation to the depth of the tool 11 as the tool is moved through the borehole 12. To control the operation of the new and improved cable-coupling apparatus 10 of the present invention, the surface instrumentation 15 also includes a power source 21 that is connected, as by a switch 22, to a selected conductor 23 in the cable 13.

Turning now to FIG. 2, a preferred embodiment of new and improved cable-coupling apparatus 10 is shown in partial cross section to illustrate one way in which the principles of the present invention may be operatively embodied. The cable-coupling apparatus 10 includes tandemly-disposed upper and lower load-supporting members 24 and 25 which are releasably retained together by a collapsible assembly of intermediately-situated load-supporting members, as at 26 and 27, between the upper and lower members. Those skilled in the art will recognize, of course, that to facilitate their fabrication and assembly, the upper and lower load-supporting members 24 and 25 are preferably divided and joined as by threads 28 and 40. As illustrated, it will, of course, be recognized that these several load-supporting members 24-27 collectively serve as the sole links joining the suspension cable 13 to the well tool 11.

The cable-coupling apparatus 10 preferably includes a tubular protective housing 30 that is coaxially disposed around the load-supporting members 24-27 and fastened to the upper end of the well tool 11 as by a threaded ring (as at 112 in FIG. 3) loosely received in a recess around the body of the tool. An elastomeric sleeve or so-called "boot" 31 is snugly fitted around the lower end of the cable 13 and abutted against the upper end of the protective outer housing 30 to provide at least a partial fluid seal. If desired, the central bore of the outer housing 30 is filled with a suitable grease for excluding well-bore fluids so long as the cable 13 is connected to the cable-coupling apparatus 10.

The several cable conductors, as at 13, are passed through the protective housing 30 around the load-supporting members 24-27 and connected by typical plugs and feedthrough connectors (not shown) in the upper end wall of the well tool 11. For reasons that will be subsequently explained, the selected conductor 23 is connected by way of a typical plug 32 to another feedthrough connector 33 mounted in the lower member 25. It will, of course, be appreciated that once any of the load-supporting members 24-27 are parted, the lower end of the suspension cable 13 can be easily withdrawn from the protective housing 30 upon failure of the relatively-weak electrical conductors 19 and 23 or disconnection of the plugs as at 32.

In this preferred embodiment of the invention, a swage fitting 34 tightly secured to the armor wires at the lower end of the cable 13 is counterbored, as at 35, to define a socket for receiving the upper end of the protective outer housing 30 on the upper support member 24. It will be recognized, of course, that where the lower portion of the cable 13 is instead terminated by a so-called "bridle" (not shown), a typical swage fitting similar or identical to that shown at 34 will also be secured to the inner member of the bridle. In either event, the upper tool-supporting member 24 will be adequately secured or fastened to the cable 13 so as to be capable of supporting loads at least as great as the expected breaking strength of the cable.

Unless an intermediate portion of the body member 25 is reduced or preferentially weakened, as illustrated at 37, for serving as a conventional weak point, the lower load-supporting member is arranged to carry loads at least as great as the anticipated breaking strength of the cable 13. The reduced or necked-down portion 37 of the lower or body member 25 is, of course, optional; and, if included, its design breaking strength will depend upon the static weight of the tool 11, the breaking strength of the cable 13, and the anticipated working conditions for the tool.

As illustrated in FIG. 2, the upper and lower load-supporting members 24 and 25 are releasably interconnected to one another by the two or more intermediately-situated members as at 26 and 27. In the preferred embodiment of the present invention, two to four intermediate members, as at 26 and 27, are cooperatively arranged as similar or identical sectorial segments which, when properly assembled, collectively define an elongated tubular member or sleeve that has been divided longitudinally for providing the several segments. To couple these collectively-assembled intermediate members to the upper and lower members, reduced-diameter portions 38 and 39 of these latter members and the internal surfaces of the segments are complementally threaded, as at 40, as required to keep the several load-supporting members 24-27 tandemly interconnected. It will, of course, be appreciated that the sectorial segments 26 and 27 defining the collapsible sleeve will remain threadingly engaged with the reduced end portions 38 and 39 of the upper and lower members 24 and 25 only so long as the segments are held together in a generally-cylindrical configuration.

Accordingly, in the preferred embodiment of the present invention shown in FIG. 2, for assembling the collapsible sleeve member the two or more segments 26 and 27 are releasably bound together by a wrapping of one or more turns of a flexible member 41 having at least a portion thereof that is electrically conductive and is formed of an electrically-fusible or disintegratable material such as a metal braid, ribbon or wire. In one manner of arranging the present invention, the flexible member 41 is entirely formed as an electrically-degradable or disintegratable element having one end electrically connected to a convenient electrical ground as at 42 on the upper load-supporting member 24; and the other end of the element is electrically connected to the feedthrough connector 33 mounted in the lower load-supporting member 25. The several turns of the element 41 are cooperatively positioned and wound with sufficient tightness to reliably retain the several segments 26 and 27 in threaded engagement with the adjacent end portions 38 and 39 of the upper and lower load-supporting members 24 and 25. It will be recognized, of course, that so long as the fusible element 41 stays intact so as to retain the several segments of the collapsible sleeve together, the several load-supporting members 24–27 will remain tandemly interconnected.

Although other types of electrically-fusible or degradable materials could be used, in the preferred practice of the present invention the electrically-fusible element 41 is formed of an unalloyed bimetallic composite of various exothermic alloys such as aluminum and palladium which are cooperatively disposed so as to be in intimate physical contact with one another. Exothermic materials such as this are ordinarily of adequate strength but are specially designed to completely fail or disintegrate readily under only moderate levels of current. For instance, as one example of what is presently available on a commercial basis, the electrically-disintegratable element 41 can be either a single strand, a multi-stranded conductor, or a braided ribbon of a bimetallic wire having an outer jacket of palladium or a palladium alloy that has been coaxially formed around an inner core of aluminum. Upon passage of a sufficient level of electrical current through the composite element 41, the metal having the lowest melting temperature (e.g., the aluminum inner core) is heated to that temperature (e.g., 600° C. for many aluminums) and thereby initiates an exothermic reaction in the other metal in the element (e.g., the palladium outer jacket). Once this exothermic reaction begins, the composite element 41 will, of course, be entirely disintegrated in no more than a few seconds. Since the disintegratable element 41 is all that holds the several segments 26 and 27 of the collapsible sleeve member in interlocking engagement with the upper and lower members 24 and 25, little or no axial force will be required to separate the tandemly-coupled members once the element disintegrates. It should be noted that by using such exothermic materials the entire element 41 disappears. This is, of course, in contrast to an alternative use of typical fuse wires that commonly fail only at their weakest point so as to possibly require a modest pull on the cable 13 to separate the segments 26 and 27. In either case, disengagement of the sleeve segments 26 and 27 is preferably facilitated by confining one or more outwardly-expansible springs, as at 43 and 44, between the segments and the load-supporting members 24 and 25.

Those skilled in the art will recognize, of course, that the electrical element 41 must be physically isolated from electrically-conductive borehole fluids as well as protected from the corrosive high-alkaline substances contained in most of those fluids. Accordingly, in the depicted preferred embodiment of the cable-releasing apparatus 10, a protective shell 45 is coaxially arranged around the lower member 25 and fluidly sealed thereto as by a weld 45. The shell 46 is cooperatively extended upwardly and terminated adjacent to an outwardly-directed shoulder 47 on the upper member 24 for defining an enclosed chamber 48 around the assembled segments 26 and 27 and the opposed end portions 38 and 39 of the load-supporting members. Although other sealing arrangements could be utilized with possibly equal effect for sealing the chamber 48, the annular gap or clearance space between the immediately-adjacent surface of the enlarged shoulder 47 and the upper end of the protective shell 45 is preferably covered and hermetically sealed by a thin metal diaphragm 49. In the preferred embodiment of the new and improved cable-coupling apparatus 10, the diaphragm 49 is formed of annealed nickel and sealingly bonded to the shoulder 47 and the protective shell 45 by continuous weld beads as at 50 and 51 which are best formed by typical electron-beam or TIG welding techniques.

Since the successful disengagement of the sleeve segments 26 and 27 from the upper and lower load-supporting members 24 and 25 requires heating of the disintegratable element 41 to extreme temperatures, the chamber 48 is preferably left with nothing more than air at atmospheric pressure in it. In this manner, rapid heating of the element 41 is assured which might not otherwise occur if the chamber 48 were instead filled with a thermally-conductive oil such as is customarily used to surround electrical components in many well tools.

Failure of the disintegratable element 41 will, of course, cause the upper and lower load-supporting members 24 and 25 to be uncoupled as the several sleeve segments 26 and 27 fall away. Nevertheless, those skilled in the art will appreciate that with the new and improved cable-coupling apparatus 10 arranged as illustrated in FIG. 2, the upper load-supporting member 24 cannot be readily separated from the lower load-supporting member 25, if at all, unless the fluids in the borehole 12 are first admitted into the enclosed chamber 48 to at least minimize the unbalanced pressure forces otherwise tending to hold the load-supporting members together. As a typical example of the magnitude of the unbalanced pressure forces which will be routinely encountered, it should be realized that if the enlarged-diameter portion 47 of the upper member passing through the diaphragm 49 has a diameter of no more than one-half inch, the axial force required to separate the load-supporting members 24 and 25 would be in the order of 2,000-pounds if the pressure at a given depth location in the borehole 12 was only 10,000-psig. In keeping with the objects of the present invention, forces of even this magnitude are, of course, unacceptably high.

Accordingly, to overcome such significant unbalanced pressure forces, the new and improved cable-coupling apparatus 10 shown in FIG. 2 further includes fluid-admitting means 52 operative in response to failure of the disintegratable element 41 for admitting borehole fluids into the chamber 48 to facilitate separation of the load-supporting members 24 and 25. In the preferred manner of accomplishing this with the apparatus 10, the reduced end portion 38 of the upper member 24 is axially bored, as at 53, and an elongated rod 54 is slidably disposed within the bore and normally positioned with its flat upper end lying flush with the entrance of the bore. To releasably secure the rod 54 in its normal position, the lower end of the rod is enlarged, as at 55, and threadingly secured to the collapsible sleeve segments 26 and 27 by way of the internal threads 40. The fluid-admitting means 52 further include a frangible closure member such as a thin metal diaphragm 56 which covers the mouth of the axial bore 53 and is fluidly sealed to the body 24 as by a weld 57 extending completely around the perimeter of the diaphragm. With the rod 54 and the diaphragm 56 in their respective positions as illustrated in FIG. 2, it will be appreciated that the flat, upper end of the rod will support the central and major part of the diaphragm against inward collapse by unbalanced pressure forces.

For any given set of well bore conditions, those skilled in the art will understand that the effective unbalanced pressure forces tending to rupture the diaphragm 56 will be the arithmetic product of the hydrostatic pressure at that depth location in the borehole 12 and transverse surface area of the unsupported portion of the diaphragm. So long as the several sleeve segments 26 and 27 are held together, this unsupported portion is only that minor portion of the diaphragm 56 bridging the annular gap or small clearance space left between the opposing surfaces of the upper end of the rod 54 and the upper end of the axial bore 53. It will, therefore, be recognized that by choosing the metal used for the diaphragm, the thickness of the diaphragm, and the transverse or surface area of the unsupported annular portion of the diaphragm, the maximum hydrostatic pressure which the diaphragm 56 can withstand before rupturing can be selectively controlled. In the preferred arrangement of the new and improved cable-coupling apparatus 10, it is preferred that upon separation of the several segments 26 and 27 defining the collapsible sleeve, the then-unsupported diaphragm 56 will be ruptured at relatively-low hydrostatic pressures so as to assure selective release of the cable 13 even when the well tool 11 becomes stuck at relatively-shallow depth locations in the borehole 12. Those skilled in the art will recognize, of course, that by using the diaphragms 49 and 56 and the several welds 46, 50, 51 and 57, the chamber 48 will be permanently sealed without using elastomer seals that are subject to progressive deterioration.

Consideration should also be given to the particular design of the element 41 and its cooperative relationship of the fluid-admitting means 52. First of all, from the preceding discussion it will be recognized that the hydrostatic pressure forces imposed on the diaphragm 56 must be fully supported by the threaded engagement of the enlarged rod portion 55 with the several sleeve segments 26 and 27. Although the loads resulting from these pressure forces are primarily axially directed, there will be a radially-directed component of these forces acting outwardly on the sleeve segments 26 and 27 that must be fully supported by the disintegratable element 41 if the load-supporting members 24 and 25 are to remain coupled together. The magnitude of these radially-directed forces are, of course, directly dependent upon the particular thread angle of the threads 40. If the springs 43 are employed, their outwardly-directed forces must also be taken into account in calculating the overall tensile forces that will be acting on the element 41 and thereby determining such things as the number of turns required and the tensile strength of the particular exothermic material which is to be used for a given cable-coupling unit 10.

Several factors will, of course, enter into the selection of a given element 41. One of the most-important of these several factors is the relationship between the tensile strength of a given element and the magnitude of electrical current required to achieve degradation or disintegration of that element. As would be expected by those skilled in the art, the electrical current required to part a given exothermic element 41 is proportionally greater with larger-diameter elements and, therefore, correspondingly-stronger elements. Thus, for a given design hydrostatic pressure, routine calculations can be readily made to determine the number of turns and the diameter of the element 41 required to retain the assembled segments 26 and 27 together as a collapsible cylinder as well as the level of electrical current required to part the element.

Those skilled in the art will appreciate, of course, that as the design operating depth and design operating pressure for the coupling unit 10 increase, longer suspension cables, as at 13, must be considered. Thus, as these design parameters are increased and require stronger elements, as at 41, the level of electrical current required to reliably achieve degradation or disintegration of the element can approach or exceed the maximum limits of the current-transmission capability for a given type and overall length of the suspension cable 13.

Accordingly, in designing the new and improved cable-coupling apparatus 10 of the present invention, the level of electrical current required to reliably achieve the separation of the element 41 can be significantly reduced by using only a fairly-short length of exothermic material as a connecting link for another and stronger material that is wound around the assembled segments 26 and 27 to releasably secure them together as a collapsible cylinder. For example, the element 41 could typically be arranged as a short length of exothermic material in tandem with several turns of a non-exothermic material that itself has sufficient strength to hold the segments 26 and 27 together. In this manner, the short length of exothermic material would itself not have to be of significant strength since most, if not all, of the required circumferential holding force would be supplied by the several turns of the non-exothermic portion of the element 41. Thus, with only minimum strength requirements, it is possible to arrange the element 41 as a small-diameter exothermic wire serving as a degradable or disintegratable link that is tandemly associated with a stronger flexible member to provide most or all of the required strength. In this manner, the current required for operating the cable-coupling apparatus 10 is held to a minimal level that is better suited where the cable 13 is of considerable length and the apparatus may be operated at extreme depths.

Accordingly, with the new and improved cable-coupling apparatus 10 arranged as portrayed in FIG. 2, it will be appreciated that ordinarily the disintegratable element 41 is tightly encircling the several split segments 26 and 27 for defining the collapsible sleeve. This arrangement will retain the upper and lower load-supporting members 24 and 25 tandemly intercoupled for safely supporting the tool 11. Should the tool 11 or the cable 13 become stuck, a decision will, of course, have to be made as to when and how the cable is to be released from the tool. In keeping with customary operating techniques, one way for releasing the cable 13 from the tool 11 is to simply pull on the cable with sufficient force that the weak-point connection, as at 37, will fail. With the weak-point connection 37 being at its depicted location, the failure of the weak point will allow most of the new and improved cable-coupling apparatus 10 to be retrieved intact before commencing fishing operations that hopefully will recover the tool 11.

As previously described, however, it is not at all uncommon for well tools such as the tool 11 and the cable 13 which are being operated in a well bore such as the borehole 12 to become stuck to the extent that the cable cannot be safely released by tensioning it. For instance, as shown in FIG. 1, the cable 13 can become keyseated in a ledge 58. A situation such as this poses no particular problem for the new and improved cable-releasing apparatus 10. Thus, whenever it is determined that the cable 13 cannot be safely released by tensioning the cable, the cable-coupling apparatus 10 may be selectively operated in its alternative mode simply by throwing the switch 22 in the surface instrumentation 15 to connect the power source 21 to the cable conductor 23. Upon the flow of sufficient electrical current through the disintegratable element 41, its aluminum core will be heated to its melting point and quickly generate an exothermic reaction with the palladium jacket so as to cause total failure of the full length of the wire binding the separate segments 26 and 27 of the split-sleeve member together. Once this occurs, the separate segments 26 and 27 of the sleeve will, of course, fall away immediately so as to be disengaged from the load-supporting members 24 and 25. The outwardly-expansible spring members 43 and 44 between the load-supporting members 24 and 25 and the sleeve segments 26 and 27 give further assurance that the segments will be positively disengaged from the upper and lower load-supporting members when the element 41 fails.

Once the element 41 fails, the unbalanced pressure forces acting on the diaphragm 56 will no longer be supported by the rod 54. As pressure drives the rod 54 into the fluid-communication passage defined by the axial bore 53, the diaphragm 56 will quickly fail for admitting fluids from the borehole 12 into the sealed chamber 48. Upon admission of fluids into the chamber 48, there will no longer be any unbalanced pressure forces opposing the separation of the load-supporting members 24 and 25. Then, once the cable 13 is pulled so as to carry the upper load-supporting member 24 upwardly in relation to the stationary lower member 25 and the well tool 11, the several conductors, as at 19 and 23, will either be broken or disconnected at the feedthrough connectors as at 33. This will, of course, allow the cable 13 to be returned to the surface to leave the upper end of the tool 11 exposed for subsequent engagement by suitable fishing tools (not shown).

Turning now to FIG. 3, a longitudinal cross-sectional view is shown of an alternative embodiment of new and improved cable-coupling apparatus 100 that also incorporates the principles of the present invention. As depicted, the preferred arrangement of this alternative cable-coupling apparatus 100 is quite similar to the apparatus 10 and similarly includes upper and lower load-supporting members 101 and 102 that are releasably intercoupled by an intermediately-positioned collapsible sleeve as collectively defined by two or more segments 103-105 (FIG. 4). Hereagain, the several segments 103-105 comprising the collapsible sleeve assembly are releasably bound by a wrapping of one or more turns of a flexible member 106 that has at least a portion thereof formed of an electrically-disintegratable or degradable braid, ribbon or wire element. The member 106 has one end electrically connected to a convenient grounding point, as at 107, on one of the load-supporting members 101 or 102 and its other end electrically connected by way of a feedthrough connector (not shown in FIG. 3) to a selected cable conductor as at 23.

The new and improved cable-coupling apparatus 100 also includes a protective shell 108 that is welded to the lower load-supporting member 102 and extended coaxially upwardly around the sleeve segments 103-105 and an enlarged shoulder 109 on the upper load-supporting member 101 for defining an enclosed chamber 110 around the disintegratable element 106. An annular metal diaphragm 111 is cooperatively arranged across the narrow clearance space between the enlarged-diameter shoulder portion 109 of the upper load-supporting member 101 and the upper end of the protective shell 108 so as to fluidly seal the chamber 110. The outer housing 30 is coaxially arranged around the several load-supporting members 101-105 and secured, as by the threaded ring 112, to the upper end of the body of the tool 11.

The interfitting telescoping arrangement of the upper and lower load-supporting members 101 and 102 will, as previously discussed, make it difficult, if not impossible, to withdraw the enlarged portion 109 of the upper member from within the chamber 110 whenever the cable-coupling apparatus 100 is operated under substantial hydrostatic pressures. To relieve such unbalanced-pressure forces impairing or preventing the selective uncoupling of the members 101 and 102, the new and improved cable-coupling apparatus 100 further includes fluid-admitting means 113 that are selectively operable in response to failure of the disintegratable element 106. In the depicted embodiment of the cable-coupling apparatus 100, the fluid-admitting means 113 include one or more members, as at 114-116, movably disposed in circumferentially-spaced lateral bores, as at 117-119, defining fluid-communication passages in the side wall of the protective shell 108. As illustrated in FIG. 4, diaphragms 120-122 are respectively sealingly welded, as at 123, over the outer ends of the lateral bores 117-119 and positioned so as to be firmly supported against inward collapse by the outer ends of the members 114-116. These members 114-116 are themselves respectively secured against inward movement by means such as a multi-part split sleeve, as at 124, that is threadedly intercoupled between an inwardly-directed reduced-diameter shank, as at 125, on each of the closure members and an outwardly-directed stud, as at 126, threadingly secured in each of the lateral bores 117-119. To releasably retain the several split sleeves 124 in their assembled positions, one or more turns of an electrically-disintegratable member such as an exothermic braid, ribbon or wire, as at 127, are tightly wrapped around each collapsible sleeve so as to secure it in place on its associated shank 125 and stud 126. Although the disintegratable element, as at 127, on each of the sleeves 124 could be hooked in series with the main element 106, it is preferred to connect each of these several elements to the conductor 23 (by way of a common feedthrough connector) so as to put all of the elements in parallel with one another.

Accordingly, it will be appreciated that upon application of sufficient electrical current to the conductor 23, the several disintegratable elements, as at 127, as well as the main element 106 will ultimately fail to allow the several split sleeves 124 and the several segments 103-105 making up the major collapsible sleeve to fall away from their normal positions as depicted in FIG. 2. Once fluids from the borehole 12 enter the chamber 110, the unbalanced pressure forces holding the members 101 and 102 together will be relieved and the load-supporting members can be readily separated simply by breaking the thin diaphragm 111.

Still another embodiment of the present invention is depicted in FIG. 5. As shown there, the cable-coupling apparatus 200 includes upper and lower load-supporting members 201 and 202 which are intercoupled to one another and releasably retained in that position by a collapsible assembly of retaining members as at 203-205. In the preferred embodiment of the cable-coupling apparatus 200, these retaining members are arranged as a central latching member 203 supported in its depicted position by a group of two or more sleeve segments, as at 204 and 205, that are releasably bound together in a collapsible cylindrical configuration by one or more turns of a flexible member 206 having at least a portion thereof formed of an electrically-disintegratable or degradable element. To protect the new and improved apparatus 200, the tubular housing member 30 is secured to the tool body (not shown) and extended coaxially upwardly around the load-supporting members 201 and 202. Hereagain, the lower end of the cable 13 is operatively connected, as at 34, to the upper load-supporting member 201 and the rubber boot 31 is arranged around the cable to minimize the entry of borehole fluids.

In the preferred manner of arranging the selectively-operated cable-coupling apparatus 200, the upper load-supporting member 201 is cooperatively configured to define an array of two or more depending laterally-deflectable collet fingers, as at 207 and 208, that are normally biased to move inwardly toward the central axis of the cable-coupling apparatus. As depicted, each of these collet fingers 207 and 208 have outwardly-projecting enlargements or shoulders, as at 209, respectively adapted to be complementally fitted and confined in an inwardly-opening annular groove 210 provided in the adjacent wall surface of an upwardly-directed tubular extension 211 of the lower load-supporting member 202. It will, of course, be recognized that so long as the several fingers, as at 207 and 208, remain in their outwardly-deflected positions the shoulders, as at 209, will respectively interact with the annular groove 210 to prevent uncoupling of the upper and lower load-supporting members 201 and 202.

To retain the several collet fingers 207 and 208 in their depicted outwardly-deflected positions, the central latch member 203 is operatively positioned within the array of collet fingers 207 and 208 so as to ordinarily prevent inward deflection of the fingers to withdraw the shoulders 209 from the annular groove 210. In the preferred arrangement for positioning the latch member 203 within the circumferentially-arrayed collet fingers 207 and 208, the latch member is located above an axial upright post or central extension 212 formed or secured in the upper end of the lower load-supporting member 202 and releasably supported thereon by way of the assembled collapsible sleeve segments 204 and 205 that are normally held together by a wrapping of one or more turns of the electrically-disintegratable wire 206. To give physical protection to the coiled fusible wire 206, the annular chamber 213 defined by the extension member 211 around the latch member 203 is sealingly enclosed by an annular metal diaphragm 214 that is welded, as at 215 and 216, between the latch member and an inwardly-directed shoulder 127 on the tubular extension member. It will be recognized that the diaphragm 214 must be designed so that its unsupported portion spanning the annular clearance space between the latch member 203 and the shoulder 217 will withstand a selected maximum hydrostatic pressure so long as the sleeve segments 204 and 205 have not separated. Hereagain, it is preferred that the diaphragm 214 provide only minimal resistance to being ruptured or failed at relatively-low hydrostatic pressures once the sleeve segments 204 and 205 collapse. By the same token, the collet fingers 207 and 208 are designed to present only minor resistance to withdrawal from the groove 210 once the sleeve segments 204 and 205 are collapsed.

Accordingly, with the new and improved cable-coupling assembly 200 arranged as illustrated in FIG. 5, it will be recognized that so long as the segments 204 and 205 comprising the collapsible sleeve assembly remain together, the latch member 203 will remain in its depicted latching position so as to keep the outwardly-projecting shoulders 209 on the latch fingers 207 and 208 lockingly engaged within the annular groove 210. Thus, with the latch member 203 in its latching position, the upper load-supporting member 201 cannot be withdrawn from the upper extension 211 of the lower load-supporting member 202.

When it is determined that the cable-coupling apparatus 200 is to be operated for releasing the cable 13 from the well tool 11, the switch 22 in the surface instrumentation 15 is operated for connecting the power source 21 to the surface end of the cable conductor 23. As previously discussed, the several multi-segments 204 and 205 defining the sleeve member will collapse upon passage of sufficient electrical current for failing the disintegratable element 206. Then, as the several sleeve segments 204 and 205 will push it downwardly as the diaphragm 214 fails and well bore fluids will be admitting into the chamber 213 by the fluid-communication passage defined by the clearance space covered by the diaphragm. As will be appreciated from FIG. 6, once the latch member 203 is withdrawn from within the array of collet fingers, as at 207 and 208, the fingers will be free to deflect inwardly to withdraw their respective shoulders, as at 209, from the annular groove 210. With the several shoulders, as at 209, out of the groove 210, the upper and lower load-supporting members 201 and 202 can, of course, be readily separated from one another by simply pulling on the cable 13 with only minimum force.

Accordingly, it will be recognized that the cable-coupling devices of the present invention are specially arranged to provide new and improved selectively-operable apparatus for releasably attaching a typical suspension cable to a well tool. By having upper and lower support members that are securely held together by a collapsible assembly of two or more members that are themselves held together by an electrically-disintegratable element, the tool can be operated in its usual fashion without risking an unanticipated disconnection. By virtue of the unique design of the collapsible assembly and its hermetically-sealed enclosure, the electrical element is permanently protected from adverse well bore environments; and the device can thereby be repeatedly used without risking undetected failures that could possibly prevent the operation of the device when it is later required. Separation of the load-supporting members is readily accommodated by the cooperative arrangement of the unique fluid-admitting means which are operative to contemporaneously admit well bore fluids into the enclosure upon operation of the device to collapse the retaining assembly.

While only particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Well bore apparatus for releasably coupling a suspension cable to a well tool and comprising:
   upper and lower support members adapted for intercoupling a suspension cable to a well tool;
   selectively-releasable coupling means including at least one movable member normally positioned between said support members for cooperatively maintaining said upper and lower support members coupled in a tool-supporting relationship and adapted for movement away from that normal position whereby said support members will no longer be in a tool-supporting relationship, and electrically-operable securing means releasably retaining said movable member in its said normal position, said electrically-operable securing means including an electrically-disintegratable member formed of an unalloyed bimetallic composite of at least two exothermic metals and adapted to be parted upon passage of electrical current therethrough for releasing said movable member for movement away from its normal position;
   means normally defining a fluid-tight chamber around said electrically-operable securing means; and
   means operable in response to release of said movable member for movement from its said normal position for admitting well fluids into said chamber.

2. The well bore apparatus of claim 1 wherein said upper support member is adapted for being dependently connected to a suspension cable and said lower support member is adapted for dependently carrying a well tool.

3. The well bore apparatus of claim 1 wherein said upper and lower support members are axially aligned and spaced from one another; and said coupling means include load-supporting shoulders respectively located on each of said members and cooperatively arranged to be in co-engagement with one another for tandemly supporting a well tool only so long as said movable member is retained in its said normal position.

4. The well bore apparatus of claim 1 wherein said exothermic metals are aluminum and palladium.

5. Well bore apparatus for releasably coupling a suspension cable to a well tool and comprising:
   upper and a lower support members adapted for intercoupling a suspension cable to a well tool, wherein said upper and lower support members have overlapping end portions with at least one of said end portions being relatively movable laterally with respect to the other, means on said overlapping end portions defining load-supporting shoulders thereon respectively arranged for co-engagement upon relative lateral movement of said one overlapping end portion toward the other of said overlapping end portions; and wherein said movable member is cooperatively arranged for blocking relative lateral movement of said one end portion away from said other end portion for keeping said load-supporting shoulders in co-engagement with one another for supporting a well tool only so long as said movable member is retained in its said normal position;
   selectively-releasable coupling means including at least one movable member normally positioned between said support members for cooperatively maintaining said upper and lower support members coupled in a tool-supporting relationship and adapted for movement away from that normal position whereby said support members will no longer be in a tool-supporting relationship, and electrically-operable securing means releasably retaining said movable member in its normal position;
   means normally defining a fluid-tight chamber around said electrically-operable securing means; and
   means operable in response to release of said movable member for movement from its said normal position for admitting well fluids into said chambers.

6. Well bore apparatus adapted for being releasably coupled to a suspension cable and comprising:
   selectively-releasable coupling means including a support member adapted for dependent connection to a suspension cable and having means defining at least one load-supporting shoulder thereon, a body member axially spaced from said support member and having means defining at least another load-supporting shoulder thereon, two or more intermediate members each having upper and lower load-supporting shoulders cooperatively arranged thereon to be normally positioned between said support member and said body member and respectively co-engaged with said one and said other load-supporting shoulders for maintaining said support member and said body member coupled together in a body-supporting relationship so long as said intermediate members remain in their said normal positions, and electrically-operable means releasably securing said intermediate members in their said normal positions;
   means normally defining a sealed fluid-tight chamber enclosing at least a portion of said support member and said electrically-operable means and including sealing means normally blocking at least one fluid-communication passage into said chamber and adapted to fail in response to well bore pressures of at least a predetermined magnitude; and
   means normally supporting said sealing means against failure by well bore pressures of at least said predetermined magnitude and operative substantially contemporaneously with movement of said intermediate members from their said normal positions to then allow failure of said sealing means for admitting well bore fluids through said passage into said chamber and thereby facilitating the uncoupling of said support member from said body member.

7. The well bore apparatus of claim 6 wherein said support member is spatially disposed above said body member so that said intermediate members are tandemly intercoupling said support and body members so long as said intermediate members remain in their said normal positions.

8. The well bore apparatus of claim 6 or 7 wherein said electrically-operable means include a retaining element securing said intermediate members in their said normal positions and having at least a portion thereof formed of an electrical conductor adapted to be at least physically degraded upon passage of electrical current therethrough for selectively releasing said intermediate members for movement away from their said normal positions.

9. The well bore apparatus of claim 8 further including biasing means cooperatively arranged for urging said intermediate members away from their said normal positions upon their release.

10. The well bore apparatus of claim 8 wherein said electrical conductor is formed of an unalloyed bimetallic composite of at least two exothermic metals.

11. The well bore apparatus of claim 10 wherein said exothermic metals are aluminum and palladium.

12. The well bore apparatus of claim 6 or 7 wherein said sealing means include a metal diaphragm; and said means normally supporting said sealing means include a rigid support normally positioned between said metal diaphragm and at least one of said intermediate members, and co-engageable shoulders respectively arranged on said rigid support and said one intermediate member for retaining said rigid support in its said normal position only so long as said intermediate members remain in their said normal positions.

13. Well bore apparatus adapted for being releasably coupled to a suspension cable and comprising:
selectively-releasable coupling means including a support member adapted for dependent connection to a suspension cable and having means defining at least one load-supporting shoulder thereon, a body member axially spaced from said support member and having means defining at least another load-supporting shoulder thereon, two or more intermediate members each having upper and lower load-supporting shoulders cooperatively arranged thereon to be normally positioned between said support member and said body member and respectively co-engaged with said one and said other load-supporting shoulders for maintaining said support member and said body member coupled together in a body-supporting relationship so long as said intermediate members remain in their said normal positions, and first electrically-operable means releasably securing said intermediate members in their said normal positions;
means normally defining a sealed fluid-tight chamber enclosing at least a portion of said support member and said first electrically-operable means and including sealing means normally blocking at least one fluid-communication passage into said chamber and adapted to fail in response to well bore pressures of at least a predetermined magnitude; and
means normally supporting said sealing means against failure by well bore pressures of at least said predetermined magnitude including a rigid support normally positioned between said sealing means and one of said members, and second electrically-operable means in said chamber releasably securing said rigid support in its said normal position and operable to move therefrom to allow failure of said sealing means for admitting well bore fluids through said passage into said chamber and thereby facilitating the uncoupling of said support member from said body member.

14. The well bore apparatus of claim 13 wherein said support member is spatially disposed above said body member so that said intermediate members are tandemly intercoupling said support and body members so long as said intermediate members remain in their said normal positions.

15. The well bore apparatus of claim 13 or 14 wherein said first and second electrically-operable means respectively include a first and second retaining element securing said intermediate members and said support in their said normal positions with each of said retaining elements respectively having at least a portion thereof formed of an electrical conductor adapted to be at least physically degraded upon passage of electrical current therethrough for selectively releasing said intermediate members and said support for movement away from their said normal positions.

16. The well bore apparatus of claim 15 further including biasing means cooperatively arranged for urging said intermediate members away from their said normal positions upon their release.

17. The well bore apparatus of claim 15 wherein each of said electrical conductors is formed of an unalloyed bimetallic composite of at least two exothermic metals.

18. The well bore apparatus of claim 17 wherein said exothermic metals are aluminum and palladium.

19. The well bore apparatus of claim 13 or 14 further including electrical-conductor means electrically interconnecting each of said electrical conductors of said first and second retaining elements.

20. Well bore apparatus adapted for being releasably coupled to a suspension cable and comprising:
selectively-releasable coupling means including upper and lower load-supporting members having opposed axially-aligned end portions respectively defining a first set of axially-spaced upper and lower load-supporting shoulders, at least two intermediate load-supporting members disposed around said opposed end portions and respectively defining a second set of axially-spaced upper and lower load-supporting shoulders adapted to be cooperatively engaged with said first set of load-supporting shoulders for tandemly intercoupling said upper and lower members, and electrically-disintegratable retaining means releasably securing said intermediate members coaxially disposed in relation to said upper and lower members in a normal position where said first and second sets of load-supporting shoulders are cooperatively co-engaged in a tool-supporting relationship;
means defining a fluid-tight chamber around and enclosing said electrically-disintegratable retaining means and at least a portion of whichever one of said upper and lower load-supporting members is adapted for connection to a suspension cable; and
means operable upon release of said intermediate members for selectively admitting well bore fluids into said chamber and including passage means communicating said chamber to the exterior of said load-supporting members, a frangible metal sealing member normally blocking fluid communication through said passage means and adapted to fail in response to a predetermined pressure differential acting thereon, and a support cooperatively arranged between said metal sealing member and at least one of said load-supporting members for supporting said metal sealing member against failure only so long as said first and second sets of load-supporting shoulders remain cooperatively co-engaged in a tool-supporting relationship.

21. The well bore apparatus of claim 20 wherein said one load-supporting member is said upper load-supporting member and further including means cooperatively arranged thereon for dependently connecting said upper load-supporting member to a suspension cable, and means cooperatively arranged for dependently connecting a well tool to said lower-load-supporting member.

22. The well bore apparatus of claim 20 wherein said electrically-disintegratable retaining means include a retaining element securing said intermediate members in their said normal positions and having at least a portion thereof formed of an electrical conductor adapted to be at least physically degraded upon passage of electrical current therethrough for releasing said intermediate members for movement away from their said normal positions.

23. The well bore apparatus of claim 22 further including biasing means cooperatively arranged for urging said intermediate members away from their said normal positions upon their release.

24. The well bore apparatus of claim 22 wherein said electrical conductor is formed of an unalloyed bimetallic composite of at least two exothermic metals.

25. The well bore apparatus of claim 24 wherein said exothermic metals are aluminum and palladium.

26. The well bore apparatus of claim 20 wherein said electrically-disintegratable retaining means include a retaining element around said intermediate members and having at least a portion thereof of an electrical conductor formed from an unalloyed bimetallic composite of at least two exothermic metals.

27. The well bore apparatus of claim 26 further including biasing means cooperatively arranged for urging said intermediate members outwardly away from their said normal positions upon failure of said electrical conductor.

28. The well bore apparatus of claim 20 wherein said first and second sets of load-supporting shoulders are defined by complementally-fitting threads respectively arranged on each of said load-supporting members.

29. The well bore apparatus of claim 28 further including means on said support defining threads for complemental engagement with said threads on said intermediate members so that upon their movement away from their said normal positions said support will be disengaged from said metal sealing member to allow failure thereof in response to pressure differentials acting thereon in excess of said predetermined pressure differential.

30. Well bore apparatus adapted for being releasably coupled to a suspension cable and comprising:
selectively-releasable coupling means including upper and lower load-supporting members having opposed axially-aligned end portions respectively defining a first set of axially-spaced upper and lower load-supporting shoulders, at least two intermediate load-supporting members disposed around said opposed end portions and respectively defining a second set of axially-spaced upper and lower load-supporting shoulders adapted to be cooperatively engaged with said first set of load-supporting shoulders for tandemly intercoupling said upper and lower members, and electrically-disintegratable retaining means releasably securing said intermediate members coaxially disposed in relation to said upper and lower members in a normal position where said first and second sets of load-supporting shoulders are cooperatively co-engaged in a tool-supporting relationship;
means defining a fluid-tight chamber around and enclosing said first electrically-disintegratable retaining means and said opposed end portions; and
means operable upon release of said intermediate members for selectively admitting well bore fluids into said chamber and including passage means communicating said chamber to the exterior of said load-supporting members, a frangible metal sealing member normally blocking fluid communication through said passage means and adapted to fail in response to a predetermined pressure differential acting thereon, a support normally positioned between said metal sealing member and one of said load-supporting members, and second electrically-disintegratable retaining means releasably securing said support in its said normal position for supporting said metal sealing member against failure only so long as said first electrically-disintegratable retaining means are securing said intermediate members in their said normal position.

31. The well bore apparatus of claim 30 wherein said first and second electrically-disintegratable means respectively include a first and second retaining element with each having at least a portion thereof formed of an electrical conductor adapted to be at least physically degraded upon passage of electrical current therethrough.

32. The well bore apparatus of claim 31 further including biasing means cooperatively arranged for urging said intermediate members away from their said normal positions upon their release.

33. The well bore apparatus of claim 31 wherein each of said electrical conductors is formed of an unalloyed bimetallic composite of at least two exothermic metals.

34. The well bore apparatus of claim 33 wherein said exothermic metals are aluminum and palladium.

35. Well bore apparatus adapted for being releasably coupled to a suspension cable and comprising:
selectively-releasable coupling means including upper and lower load-supporting members having axially-aligned overlapping end portions respectively defining co-engageable load-supporting shoulders with at least one of the end portions being laterally deflectable in relation to the other of said end portions, an intermediate member coaxially disposed and normally positioned between said overlapping end portions and adapted to cooperatively block lateral deflection of said deflectable end portions, and means including electrically-disintegratable retaining means releasably supporting said intermediate member coaxially disposed in relation to said upper and lower members in its said normal position where said load-supporting shoulders are cooperatively co-engaged in a tool-supporting relationship;
means defining a fluid-tight chamber around said electrically-disintegratable retaining means and said overlapping end portions; and
means operable upon release of said intermediate member for selectively admitting well bore fluids into said chamber and including passage means communicating said chamber to the exterior of said load-supporting members, a frangible metal sealing member normally blocking fluid communication through said passage means and adapted to fail in response to a predetermined pressure differential, and a support cooperatively arranged between said metal sealing member and at least one of said intermediate members for supporting said metal sealing member against failure only so long as said load-supporting shoulders remain cooperatively co-engaged in a tool-supporting relationship.

36. The well bore apparatus of claim 35 wherein said supporting means include one or more support members; said electrically-disintegratable retaining means include a retaining element securing said support members for retaining said intermediate member in its said normal position with at least a portion of said electrically-disintegratable retaining means formed of an electrical conductor adapted to be at least physically degreaded upon passage of electrical current therethrough for releasing said support members to allow said intermediate member to move away from its said normal position.

37. The well bore apparatus of claim 36 wherein said electrical conductor is formed of an unalloyed bimetallic composite of at least two exothermic metals.

38. The well bore apparatus of claim 37 wherein said exothermic metals are aluminum and palladium.

* * * * *